Aug. 27, 1935.  F. D. ROHMER  2,012,917
SPARE LIGHT BULB CARRIER FOR VEHICLES AND RUNNING
LIGHT INDICATING SYSTEMS EMBODYING THE SAME
Filed Oct. 4, 1933  2 Sheets-Sheet 1
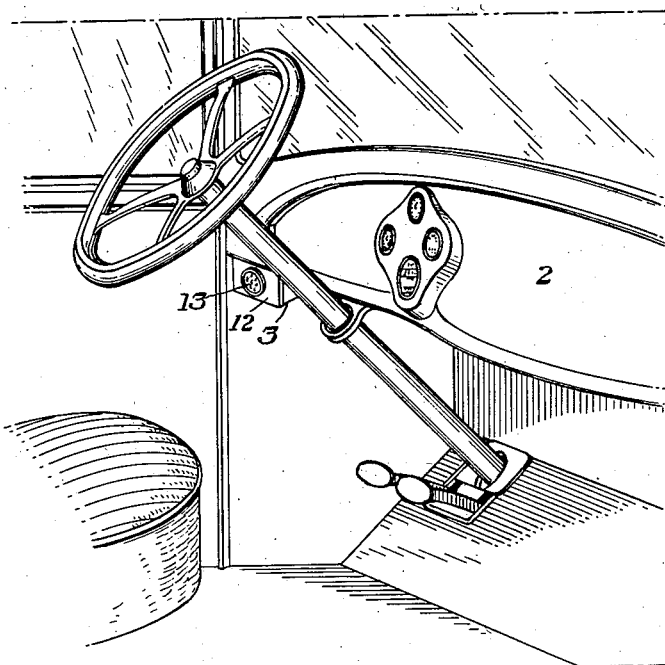
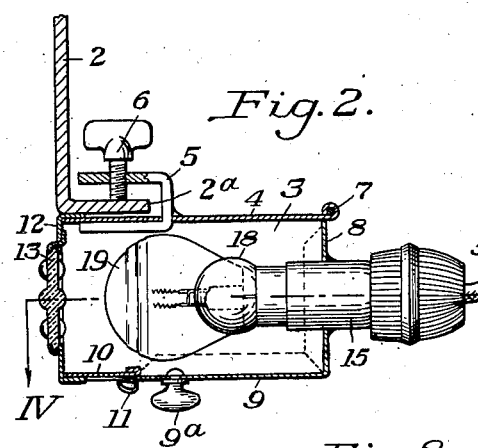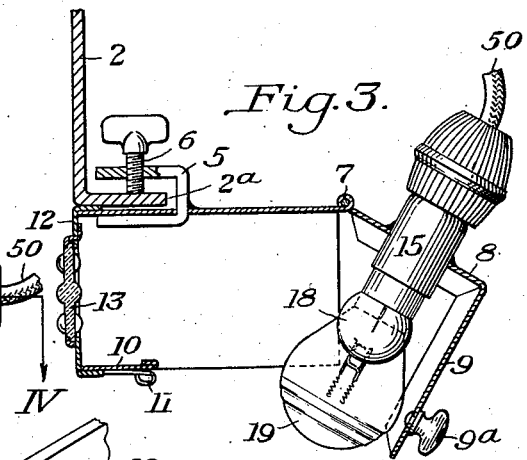
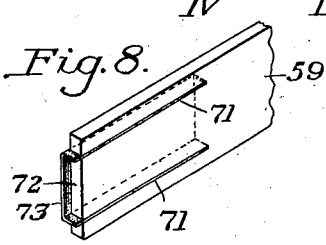
INVENTOR Aug. 27, 1935.  F. D. ROHMER  2,012,917
SPARE LIGHT BULB CARRIER FOR VEHICLES AND RUNNING
LIGHT INDICATING SYSTEMS EMBODYING THE SAME
Filed Oct. 4, 1933  2 Sheets-Sheet 2
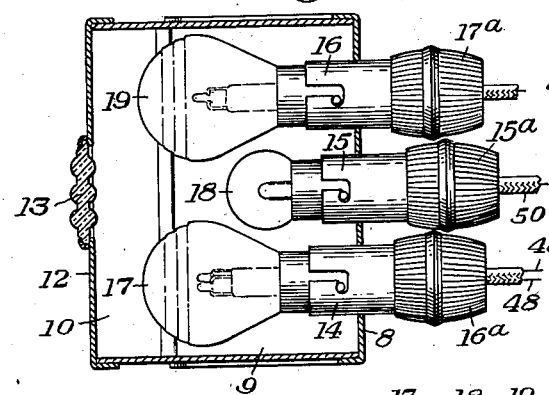
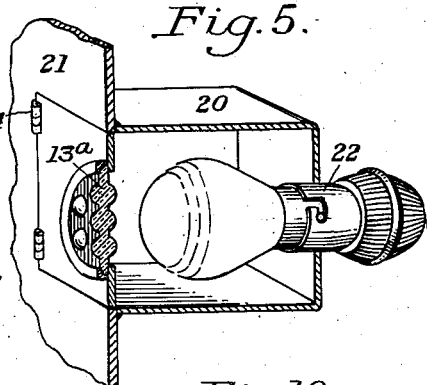
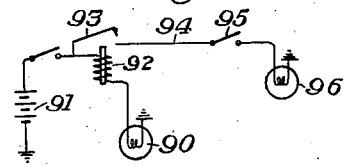
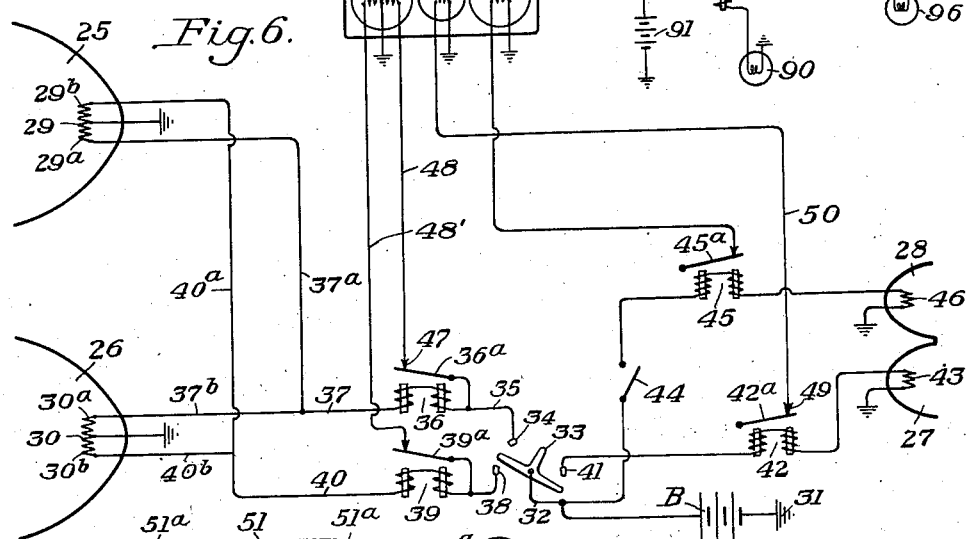
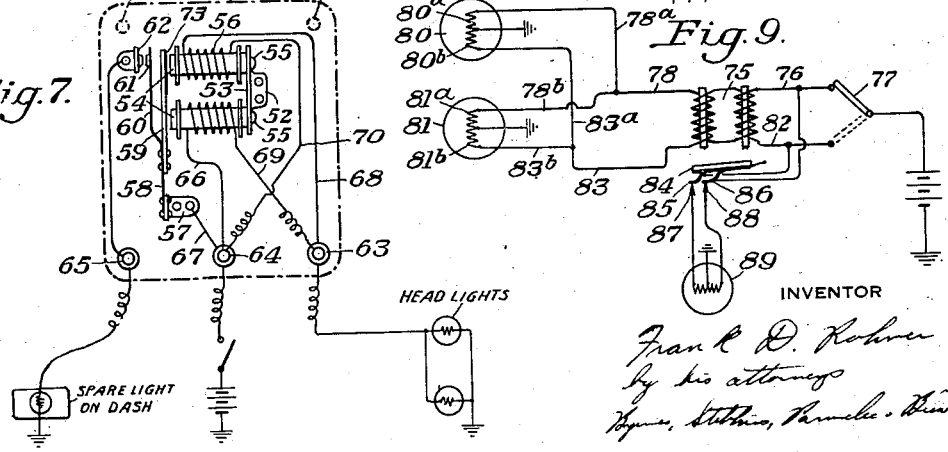
INVENTOR
Frank D. Rohmer
by his attorneys Patented Aug. 27, 1935

2,012,917

UNITED STATES PATENT OFFICE 2,012,917

SPARE LIGHT BULB CARRIER FOR VEHICLES AND RUNNING LIGHT INDICATING SYSTEMS EMBODYING THE SAME

Frank D. Rohmer, Midland, Pa., assignor to Bocjl Corporation, Pittsburgh, Pa., a corporation of Delaware Application October 4, 1933, Serial No. 692,110

10 Claims. (Cl. 177—311)

This invention relates to automobile lighting systems and, more particularly, to a carrier for spare and replacement bulbs and an indicating system embodying such carrier for showing when one of the running lights of the vehicle needs a replacement bulb.

Statistics show that a great many automobile accidents occurring after dark are occasioned by the failure of one or more of the running lights required by law to be on the vehicle. Many of these accidents are occasioned by failure of the tail light. Others are caused by failure of one or both of the headlights. Also many accidents are attributable to the failure of an automatic stop light at the rear of the vehicle. In many places, a motorist having defective running lights is subject to arrest. This is true even though the motorist may not be aware that a particular light has ceased to burn. This is especially true of the tail light or stop light, since one of such lights may burn out while the vehicle is in motion and the operator would have no means of knowing that the light is out. Also it is extremely difficult under certain conditions to know whether or not both headlights are lighted. Oftentimes in the event of such an accident the motorist is in a position to assert that he had no reason to believe that any of the lights were out. On the other hand, motorists are frequently arrested for having defective running lights, even though they have a box of spare bulbs in the car and are entirely unaware of the fact that the lighting is defective.

According to the present invention, there is provided a spare light carrier in which a complete replacement set of running lights can be carried, the lights being supported in such a way that they are always instantly available to the motorist and protected against breakage. There is further provided, according to this invention, means whereby upon the failure of any one of the running lights, an indication will be given by the lighting of a lamp in the spare lamp carrier. The motorist is thereby warned that one of his running lights is defective. The invention further contemplates that the replacement bulbs themselves will give this indication, the bulb in the spare light carrier which lights corresponding to that running light which has become defective and requires replacement. For instance, if the tail light of the vehicle burns out, the replacement bulb in the spare bulb carrier will immediately light. Likewise if any other one of the running lights becomes extinguished, the corresponding spare bulb in the replacement kit will light. This system will thereby afford protection to the motorist, both by reason of the fact that he is instantly informed of any defect in his running lights, and in the fact that he cannot be innocently arrested for driving with improper lights. The invention affords protection to traffic and highway patrolmen, because there can be no excuse for a motorist driving with defective running lights, so that the officer is not subject to reprimand and criticism for arresting a motorist who has defective running lights. If the car has its full complement of running lights and its full complement of replacement bulbs, no motorist could claim to be unaware of the burning out of any particular lamp. The invention affords protection to the public generally, both by reason of the fact that it assures of vehicles operating with the full requirement of running lamps, a complete set of spare bulbs with a new bulb at all times acting as an indicator and because of the fact that in any controversy a motorist having the system cannot claim ignorance of the failure of a particular light.

The invention may readily be understood by reference to the accompanying drawings, in which Figure 1 is a general view representing the interior of the vehicle, showing the position in which the spare bulb carrier may be carried on the dash board of the vehicle;

Figure 2 represents a transverse longitudinal section through the spare bulb carrier, the view showing the manner of attachment of this particular form of carrier to the dash board;

Figure 3 is a view similar to Figure 2 showing the manner in which the kit opens to give access to the replacement bulbs;

Figure 4 represents a horizontal section substantially in the plane of line IV—IV of Figure 2, showing the different assortment of bulbs comprising a typical replacement set;

Figure 5 is a perspective view in section showing a slightly modified form of container or carrier;

Figure 6 is a circuit diagram illustrating a circuit by means of which indication is given in the spare bulb carrier of the bulb which requires replacement;

Figure 7 is a plan view of a typical relay adapted for use in connection with my invention;

Figure 8 is a detail view showing the construction of the armature of the relay, particularly the relay for the headlight circuits;

Figure 9 is a circuit diagram in which there is a combination relay construction, and Figure 10 is a diagram showing a further modified circuit.

Referring first to the construction shown in Figures 1 to 4, inclusive, 2 designates a conventional metal dash board of a passenger automobile. This dash board is customarily provided with an inwardly turned lip 2a for strengthening the dash board. The present invention contemplates as one embodiment the provision of a box 10 which may be clamped to the dash board and which may be readily opened to give access to the spare bulbs. This box or carrier is generally designated as 3 and comprises, in the form shown in Figures 2, 3 and 4, a body 4 having a tongue 5 secured to the top thereof. Passing through the tongue 5 are one or more thumb screws or wing screws 6. The inturned lip 2a of the dash board is adapted to extend under this tongue, and the box is clamped in place by tightening up on the screws or bolts 6. At the rear of the box is a hinge 7, this hinge supporting the rear end wall 8 of the bottom part 9 of the box. The rear wall 8 and the bottom part 9 form an integral movable portion suspended from the hinge 7. At the front of the box there is a fixed bottom portion 10. Resilient detents 11 serve to normally hold the movable portion of the box in the position shown in Figure 2. However, the box may be opened against the resistance of these resilient detents and swung down through an arc as illustrated in Figure 3. The front of the box comprises a wall 12 in which is a glass ruby 13. Mounted on the rear wall 8 of the box is a plurality of lamp sockets 14, 15 and 16, these sockets being standard for automobile lamps. Each socket provides a holding and supporting means for a single spare bulb. For instance, the socket 14 may support headlight bulb 17, the socket 15 a tail light bulb 18, and the socket 16 a stop light bulb 19. Each of these bulbs is different from the other, either in the type of filament, the candle power or the number of contacts. On the outside of the rear wall 8 of the carrier are connectors 14a, 15a and 16a for connecting the sockets 14, 15 and 16, respectively, with a source of current as will be hereinafter more fully described.

When the carrier is secured to the dash in the manner shown in Figures 2 and 3, it occupies very little room. Upon the motorist finding that a bulb is to be replaced, it is merely necessary for him to open the box and extract the desired bulb from the kit. When he gets a new spare bulb he mounts it in the socket from which the former one was removed. To facilitate opening of the container, I have shown a knob 9a which can be easily grasped to pull down on the bottom part 9 to open the carrier. The purpose of the glass ruby 13 is to indicate to the motorist when any one of the spare bulbs within the casing lights upon failure of the corresponding running light of the vehicle, as will be more fully described.

In the construction shown in Figures 2 to 4, the bulbs and sockets are carried on a movable part of the housing or container. It is obvious, however, that various modifications and changes may be made, and in Figure 5 I have illustrated one modification in which the spare bulb socket or sockets are mounted on a fixed part of the container, and access is had to the interior of the container through a door at the front of the container, this door carrying the glass ruby. In this modification, 20 designates the box generally. It is shown as being mounted in an opening formed in the dash 21, indicating one manner in which the invention is adapted for new car construction.

On the rear wall of the container, there may be one or more light sockets 22 corresponding to the sockets 14, 15 and 16 previously described. At the front of the box and flush with the dash 21, is a hinged door 23, the hinge being indicated at 24. This door carries a glass ruby 13a. When it is desired to replace a bulb in the vehicle running lights, this door is opened and the operator removes a spare bulb from the socket 22. The two modifications of the carrier as herein described are merely typical of different arrangements which may be employed within the contemplation of the present invention.

The lighting system of an automobile ordinarily comprises a battery, one side of which is grounded on the automobile frame. The other side of the battery is connected to the various light filaments through a proper switch or switches. Fig. 6 illustrates a typical automobile lighting circuit having my invention applied thereto. In the diagram, 25 and 26 designate generally the headlights, 27 is the tail light, and 28 is the stop light. The tail light and stop light are frequently combined in an integral structure and instead of two bulbs being used, a single bulb with two filaments is employed. The diagram of Figure 6 is intended to indicate either of these well-known arrangements. The headlights 25 ordinarily employ one bulb each, each bulb having two filaments, one being the so-called high ray filament and one being the so-called low ray filament. The diagram shown in Figure 6 indicates these double-filament bulbs in the head lamps 25 and 26, as 29 and 30, respectively. A battery B is shown as having one side grounded at 31. The other side of the battery has a lead wire 32 going to a switch 33 which controls the tail light 27. The switch is selective for connecting the high or low ray filaments of the headlights with the battery. The present invention contemplates the use of relays in series with the respective lamp filaments so arranged that upon the failure of any one of the running lamps, the corresponding lamp in the spare replacement lamp carrier lights. In the preferred arrangement of my invention, there is a single relay for the high filaments of the two head lamps and a single relay for the low filaments of the two head lamps. There is also a relay for the tail light and a relay for the stop light. Tracing the headlight circuits first, one circuit leads from the switch arm 33 to the contact 34 through wire 35 to the relay field magnets 36. From the relay field magnets 36 there is a wire 37 which branches, one branch 37a going to one side 29a of the lamp filament 29. The other branch 37b connects with the filament 30a of the lamp 30. The one relay 36 is, therefore, in series with the two head lamp filaments 29a and 30a. The circuit for the other headlight filaments comprises the switch contact 38, the field coils of the relay 39 and the wire 40. The wire 40 branches and one branch 40a goes to the filament 29b of the headlight 29 and the other branch 40b goes to the headlight filament 30b of the headlight 30. The return circuit for the filaments is as indicated through the grounded side of the circuit. The tail light circuit includes the switch contact 41, the relay coils 42 and the lamp filament 43. The stop light circuit leads from the battery B through the stop light switch 44 and relay coils 45 to the filament 46 of the stop light bulb. The construction of the relays is such that as long as the lights are burning normally, the armature of the relay will be held magnetically in one position. If, however, a filament burns out, thereby diminishing or completely shutting off the flow of current through the relay, the armature will be released to close a circuit through the corresponding bulb in the spare lamp kit. For instance, in Figure 6, if either one of the headlight filaments 29a or 39a burns out, the armature 36a of the relay 36 closes a circuit from the line 35 through a contact 47 to wire 48 leading to the spare headlight bulb 17 in the socket 14 in the box 3. If one of the filaments 29b or 30b burns out, the circuit is closed to the armature 39a and wire 48' and the spare headlight bulb 17. The relay 36 through its armature 36a controls one filament of the bulb 17 and the relay 39 through its armature 39a controls the other filament. Both relays might obviously be connected to one filament of the spare bulb 17. In this case, however, the indication of a burnt out bulb would cause one of the relays to act as a buzzer. As soon as the operator sees that the light 17 is burning, he knows that one of the headlights is defective either in the high or low filament and can thereupon immediately replace the defective light. If the tail light filament burns out, the armature 42a of the relay 42 closes a circuit with a contact 49 which leads to wire 50 to the spare tail light bulb 18. Likewise the armature 45a of the relay 45 in the stop light circuit serves upon de-energization of the coils 45 to close a circuit through the spare stop light bulb 19 in the kit or carrier 3.

The general construction and design of the relays may be varied considerably, and their location in the automobile can be varied according to commercial requirements. Under some circumstances, the relays might be carried directly on or in the same casing with the spare bulbs. Preferably, however, the relays are provided as separate units and are mounted at any convenient place under the cowl or under the hood. The relays are preferably constructed along the line of the ordinary cheap buzzer. The relays 36 and 39 are of identical construction and one of them is shown in detail in Figures 7 and 8. The relay as therein disclosed comprises a base plate 51 having one or more holes 51a therein by means of which screws or bolts can pass for securing the relay in position. Carried on the base is a bracket 52 supporting the core structure 53 of an electromagnet, this core structure comprising two spools each of which is designated 54 connected by a cross bar 55. A comparatively few turns of wire are wound on each of these spools, the wire coils being designated at 56. Secured to the base 50 is another bracket 57 to which is riveted a flat leaf spring 58 which carries the armature 59, the structure being similar to the structure of the ordinary electromagnetic buzzer. Secured to the armature is a contact member 60 having a point 61 thereon adapted to contact with contact member 62, the member 62 also being carried on the base 50. The bracket 57 and the contact 62 are insulated from the base 50, if the base is made of metal, by means of sheet fiber. There are three binding posts on the base, these being designated 63, 64 and 65, and they are electrically insulated from one another. The central binding post 64 is adapted to be connected into the battery side of the circuit. Wire 66 leads from the central binding post to one of the coils 56. The second wire 67 connects with the bracket 57. The binding post 63 is adapted to be connected to the headlight side of the circuit. Wire 68 is provided leading from this binding post to one end of the second coil 56. The two coils 56 may be connected in series by joining wires 69 and 70 or may be connected in parallel by connecting the wire 69 with the post 63 and the wire 70 with the post 64. With 32 candle-power lamps, the two coils are preferably connected in parallel and with 21 candle-power lamps the two coils 56 are preferably connected in series. In commercial practice the wires 69 and 70 are preferably left disconnected until the relay is installed in the car, at which time the connections can be completed according to the candle-power of the bulb which is used. The lower candle-power lamps, of course, consume a smaller amount of current. Less current, therefore, flows through the coils and the magnetic effect is increased by having the coils in series.

The function of the spring 58 is to provide a swinging support for the armature 59 and to normally bias the armature away from the poles of the magnet. However, when the lights are burning, the armature is attracted to the poles and the circuit between the contacts 61 and 62 is broken. The single relay is designed to function if either of the headlights becomes defective. This means that since both lights are burning, the armature 59 will be attracted to the poles of the magnet. If, however, one light becomes defective, only one-half as much current flows through the magnet, and the armature should therefore release. In order to assure that the armature will release upon this diminishing current flow, non-magnetic material is applied to the face of the armature where it contacts with one of the poles. This non-magnetic material may be either copper or brass or it may be oiled paper of the type commonly used for electric insulation and known commercially as "fish paper".

In Figure 8, I have shown one manner of securing fish paper to the armature. The armature 59 is slotted inwardly from the ends adjacent the two edges, the slots being designated 71. The central tongue 72 between the slots 71 is thus sprung out of position and a piece of fish paper bent to U-shape is slipped into the armature and the tongue 72 then bent back to its normal position. The edges of the paper are then clamped in the slots 71. Without the paper designated 73 being in place, or in the absence of other non-magnetic material to break the magnetic circuit between the armature and one of the pole pieces, the magnetic influence of the current from the one remaining light in the headlight circuit will be sufficient to prevent the relay from operating. The use of the non-magnetic material, therefore, assures that the relay will operate whether the current flow through it stops entirely or diminishes.

The relays 42 and 45 are of similar construction, but since they function with only one lamp filament in the circuit, the two relays can be permanently connected in series and the use of non-magnetic material on the armature is not necessary. Moreover, the tail light bulb is usually a relatively small bulb, rated at 2 or 3 candle-power. The relay for this lamp, therefore, usually has a considerably greater number of turns of wire on the spool than is necessary or desirable with the other lamps.

The relays are preferably provided as individual units so that they can be separately installed and the price per unit be very small. It is obvious, however, that all four relays may be compactly assembled on a single base where this is the commercially desirable thing to do.

By reason of the fact that one side of the sockets in the spare bulb carrier is grounded in this manner, the wiring for the spare lamp bulbs is considerably simplified. One side of each of the sockets 14, 15 and 16 is grounded in the metal box 3, which in turn is clamped to the metal body of the car and the circuit from the relay through the lamp bulb is, therefore, completed through the grounded side of the circuit. It will also be noted by reference to Figure 6 that the relays are interposed between the lights and the switch 33. Therefore, the bulbs 17, 18 and 19 can only be lighted when the switch 33 is closed. When the headlights or stop light or tail light are not being used, their corresponding relays are not energized, nor can the corresponding spare lamps be lighted.

While I have previously described the action of the circuit as depending upon the burning out of one or more of the lamp filaments, it will, of course, be understood that the indicating device functions where a lamp becomes otherwise defective, jars loose from its socket, or where the connection between the relay and the lamp becomes broken in any way.

In order to eliminate one of the relays, where this is a matter of importance, the relays for the two headlight circuits may be combined into a single structure. This is illustrated in Figure 9 in which the relay 75, corresponding in its general construction to the one shown in Figures 6 and 7, has a double winding on the core instead of a single winding. This, of course, may be done by winding one coil over top of the other or by simultaneously winding two wires side by side on the magnet spools. One set of windings is connected in series with one of the headlight filament circuits and the other winding is connected in series with the other headlight filament circuit. In Figure 9, the wire 76 leads from the light switch 77 through one winding of the relay 75 to the wire 78. The wire 78 branches, one wire 78a going to a headlight filament 80a of the headlight bulb 80 and the other 78b going to the filament 81a of the headlight bulb 81. In like manner wire 82 leading from the switch 77 is connected with the other relay winding, and from the relay winding the circuit comprises the wire 83 and divides into branches 83a and 83b. Wire 83a leads to filament 80b of bulb 80, and wire 83b leads to filament 81b of bulb 81. The switch 77, of course, is provided to enable one set of filaments or the other to be used. At no time are both sets of filaments for both lamps 80 and 81 in use. The armature of the relay 75 is designated 84. It carries two electrically separate contacts 85 and 86. Contact 86 is connected to the wire 76 and contact 85 is connected into the wire 82. There are two contacts for co-operating with the armature contacts 85 and 86, these two contacts being designated 87 and 88, respectively. Contact 87 is connected with one filament of the spare bulb 89 and contact 88 is connected with the other filament of the spare bulb 89.

As previously stated, only one set of field coils in the relay 75 is energized at one time, because of the fact that both filaments of both headlights are never lighted at the same time. When both filaments of either circuit are operating, the armature 84 is attracted by the electromagnet. As previously explained, however, if one filament fails to operate, the armature 84 is released. The releasing of the armature causes contact to be made between the contacts 85 and 87 and the contacts 86 and 88. One or the other of the filaments in the bulb 89 will thus be lighted, this depending on whether the switch 77 is connected with the circuit 76 or the circuit 82. In Figure 9 I have disclosed only the head lamp circuits, the circuits for the tail light and the stop light remaining the same.

The advantages of the present invention arise from the provision of a spare bulb kit or carrier which can be secured in a convenient and visible place on the vehicle body, in which the bulbs are rigidly supported and in which they are kept safely and clean until used. A further advantage resides in the provision of means for indicating when any one of the running lights needs to be replaced. Another important advantage of the invention is the fact that when a running lamp needs to be replaced, the corresponding bulb in the kit is lighted. The lighting of the bulb, of course, is apparent to the operator by reason of the fact that the spare bulb carrier is provided with the window or glass ruby 13. As soon as the operator sees the light through the window or ruby 13, he can open the box and readily see which one of the three bulbs is required. By reason of the fact also that the signal light which indicates the presence of a defective running light, is one of the spare bulbs, the operator of the automobile knows, when he removes the spare, that the signal in circuit will not function until the spare bulb so removed is replaced. The device, therefore, furnishes a reminder to the driver, of the necessity of immediately providing a new spare upon the removal of a previous one.

It has heretofore been proposed, and commercially used to some extent, to connect the automobile dash lamp and the tail light in series. In this case, if the tail light burns out, the circuit through the dash light is broken. Such a system, however, is open to several objections. One is that the dash light bulb is just as likely to be burned out as the tail light bulb and, unless the operator has a spare bulb, he cannot find out whether the defective bulb is the tail light bulb or the dash light bulb. Moreover, standard automobile bulbs are designed to operate on from 6 to 8 volts. The connection of the two bulbs in series demands that the tail light bulb and the dash light bulb be each 3 volt bulbs. It is difficult to obtain 3 volt bulbs. Moreover, if one of the bulbs burns out and the operator does not have a spare bulb, he cannot short circuit the defective bulb and illuminate the good bulb, because of the fact that there is then a 6 volt current imposed on the remaining bulb. If this were done, the remaining bulb would immediately burn out. In the arrangement shown in Figure 10, I have shown a modification of my circuit adapted for use where it is desired to indicate with the dash light, a defective tail light. The tail light bulb is designated in this diagram as 90. It is connected with the battery 91 through relay 92. Relay 92 has an armature 93 adapted to close a circuit to wire 94 leading through dash light switch 95 to dash light bulb 96. As long as the relay 92 is energized, the armature 93 is held down to close the circuit to the dash light 96. If the tail light burns out, the relay 92, of course, is de-energized and the circuit to the dash light 96 is opened. If, therefore, the dash light fails to burn, the operator of the vehicle knows that either the tail light or the dash light is burnt out. If the dash light is burnt out, the tail light will remain lighted. If, however, the operator finds that the tail light is out, he knows that it is the tail light bulb and not the dash light which has failed. The system thus has many advantages over the arrangement where both lights are in series. Moreover, the bulbs 90 and 96 are interchangeable and both are designed to operate on the full voltage of the light circuit.

While I have shown in Figure 4 and in the circuit diagram of Figure 6, a container having three spare bulbs, one a headlight, a tail light and a stop light, it will be understood that a fewer number of sockets may be provided or a greater number may be provided. For instance, where the tail light and stop light are combined and have a single two-filament bulb, it would be necessary to have only two bulbs in the spare bulb kit. On the other hand, some persons may desire to carry two spare headlight bulbs instead of one, in which case an additional socket may be provided. Obviously, also some sockets might be dummy sockets and others connected in the relay circuits. Various other changes and modifications are also within the contemplation of the invention. While I have specifically described the invention in connection with automobiles, it will be understood that this term "automobile" is intended to include various types of motor-propelled vehicles, as aeroplanes, motorcycles, etc.

I claim:

1. A spare bulb carrier for vehicles having a running light, comprising a casing, means rigidly securing the casing to the vehicle, a movable cover for the casing for giving access to the interior thereof to permit of the removal and insertion of bulbs, and a wired lamp socket inside the casing for holding a spare bulb, a spare bulb in the socket corresponding to said running light, said socket being standard for the type of bulb used for the said running light of the vehicle, and means for lighting said bulb in the casing only when the said running light on the vehicle needs replacing.

2. In a vehicle lighting circuit having a running light and a circuit for said light, a replacement bulb carrier comprising a wired socket for holding a replacement bulb, a replacement bulb in said socket replaceable for said running light, said replacement bulb carrier being remotely located with respect to the running light, and means in said circuit for lighting the replacement bulb in the carrier upon failure of the running light.

3. The combination with a vehicle having a plurality of running lights with circuits for said running lights, of a spare bulb carrier comprising a casing having a plurality of wired lamp sockets therein adapted to receive and support replacement lamp bulbs corresponding to the lamp bulbs of the running lights, bulbs in said sockets replaceable for respective running lights, said casing having a movable cover portion which is normally closed but which may be opened to give ready access to said replacement bulb sockets, said casing also having a window therein, and means for connecting one of said sockets in the lighting circuit upon failure of one of the running lights to thereby energize the replacement bulb.

4. The combination with a vehicle having electric running lights and circuits therefor, of a replacement bulb carrier rigidly supported on the vehicle, said carrier comprising an enclosing casing having a plurality of sockets and each provided with electric contacts therein for supporting a plurality of bulbs similar to the bulbs used in the running lights of the vehicle, there being different types of bulbs in the running lights, and different types of bulbs in the sockets in the carrier corresponding to the different types used in the running lights, and means in the running light circuits for connecting a replacement bulb in the carrier in the circuit when a corresponding type of bulb in the running light system fails to operate, said replacement bulb carrier being of a character which may be easily opened to afford access to the bulbs supported therein.

5. The combination with a vehicle having a plurality of running lights using different type lamp bulbs and having circuits for said running lights, of a replacement bulb carrier on the vehicle having a plurality of wired lamp sockets therein and a plurality of replacement bulbs in the sockets in the carrier, there being a replacement bulb for each type of running light used on the vehicle, said replacement bulb carrier having a door permitting the ready removal and insertion of bulbs in the carrier, and means in the running light circuits for connecting a given type of replacement bulb in the carrier and in circuit upon the burning out of the corresponding light on the vehicle.

6. A spare bulb carrier for motor vehicles comprising a metal casing, a plurality of sockets in the casing adapted to receive and hold replacement bulbs, said sockets having one side thereof grounded on the casing and having separate lead wires connected to the other side thereof, means for grounding the casing on an automobile frame, a cover for the casing through which access may be had to bulbs in said sockets, a window in said casing through which the lighting of any of the bulbs is made visible and a plurality of controls for connecting different sockets through the respective lead wires thereof to a source of electric current in the lighting system of the vehicle in which the carrier is used and which lighting system has a plurality of different lights through which said controls are governed.

7. The combination with a vehicle having a dash, and having running lights with circuits for said lights, of a replacement bulb carrier secured to the dash of the vehicle, said carrier comprising a closed casing having a window therein at the front of the dash and having a plurality of wired lamp sockets therein for rigidly supporting a plurality of replacement bulbs, a door for the casing operable from the front of the dash for giving access to said replacement bulbs, and means in the running light circuits connected with the sockets in said casing for lighting a predetermined replacement bulb upon failure of a corresponding bulb in the running light system.

8. The combination with a replacement bulb carrier and a vehicle having running lights, of a carrier comprising a casing and means for rigidly securing the casing to the vehicle within the vision of the operator of said vehicle, a door for the casing, and a plurality of wired lamp sockets in the casing for supporting a plurality of replacement lamps, said sockets being standard for the bases of the bulbs used in the vehicle running lights and serving to hold the bulbs out of contact with one another, and means in the circuit for said running lamps for lighting the corresponding replacement lamp upon failure of any running lamp.

9. A replacement bulb carrier for vehicles comprising a casing, clamping means on the casing for securing the same to the dash of a vehicle, said casing having a hinged cover portion, and a plurality of wired lamp sockets carried on the hinged cover portion, said cover portion opening downwardly and giving access to the sockets for replacement and removal of bulbs therefrom, said wired sockets being provided with circuit controls for connecting them into the vehicle lighting circuit, said controls being for connection in the running light circuit of the vehicle in such manner as to cause the corresponding replacement bulb in the carrier to be energized upon failure of a given running light.

10. A vehicle lighting circuit having a running light, a circut for said light, a replacement bulb socket for holding a bulb replaceable for said running light and remotely located with respect to the running light, a replacement bulb in said socket, and means for connecting the replacement bulb in the circuit for the running light upon failure of the running light.

FRANK D. ROHMER.